(12) United States Patent
Han et al.

(10) Patent No.: US 11,234,550 B2
(45) Date of Patent: Feb. 1, 2022

(54) SQUEEZING THREADED ROD, SQUEEZING COMPONENT, AND FOOD PROCESSOR

(71) Applicants: GUANGDONG MIDEA CONSUMER ELECTRICS MANUFACTURING CO., LTD., Foshan (CN); MIDEA GROUP CO., LTD., Foshan (CN)

(72) Inventors: Han Han, Foshan (CN); Weijie Chen, Foshan (CN); Yan Tang, Foshan (CN)

(*) Notice: Subject to any disclaimer, the term of this patent is extended or adjusted under 35 U.S.C. 154(b) by 353 days.

(21) Appl. No.: 16/232,010

(22) Filed: Dec. 25, 2018

(65) Prior Publication Data

US 2019/0125118 A1 May 2, 2019

Related U.S. Application Data

(63) Continuation of application No. PCT/CN2017/074760, filed on Feb. 24, 2017.

(30) Foreign Application Priority Data

Jul. 6, 2016 (CN) .......................... 201610533189.X
Jul. 6, 2016 (CN) .......................... 201620714950.5

(51) Int. Cl.
*A47J 19/00* (2006.01)
*A47J 19/04* (2006.01)
(Continued)

(52) U.S. Cl.
CPC .............. *A47J 19/025* (2013.01); *A47J 43/00* (2013.01); *A47J 43/085* (2013.01)

(58) Field of Classification Search
CPC .... A47J 19/00–027; A47J 19/04; A47J 19/06; A47J 43/08–087
See application file for complete search history.

(56) References Cited

U.S. PATENT DOCUMENTS 2,348,341 A * 5/1944 Gough .................. A47J 43/082
  310/66
4,106,401 A * 8/1978 Ackeret ................ A47J 19/023
  99/508

(Continued)

FOREIGN PATENT DOCUMENTS

CN     101874714 A    11/2010
CN     202760965 U     3/2013
(Continued)

OTHER PUBLICATIONS

English translation of CN 202760965 (Year: 2013).*
(Continued)

*Primary Examiner* — Michael A Laflame, Jr.
(74) *Attorney, Agent, or Firm* — Kilpatrick Townsend & Stockton, LLP

(57) ABSTRACT

The present disclosure provides a squeezing threaded rod, a squeezing component and a food processor. The squeezing threaded rod includes: a rod body, and the rod body includes a feeding segment, a squeezing segment connected with the feeding segment and a residue discharge segment connected with the squeezing segment; and the area of the cross section of the rod body gradually increases from the feeding segment to the squeezing segment. In the squeezing threaded rod provided by the embodiments of the present disclosure, the stress direction of juice squeezing and residue discharge thereof is consistent with the thrust direction of the rod body, in this case, the juice squeezing force and the residue discharge force can be increased, the food residues at a residue discharge opening can be discharged more easily, then the phenomenon that the food residues block the residue discharge opening can be reduced.

11 Claims, 8 Drawing Sheets

(51) Int. Cl.
    *A47J 19/06*     (2006.01)
    *A47J 43/08*     (2006.01)
    *A47J 19/02*     (2006.01)
    *A47J 43/00*     (2006.01)

(56) References Cited

U.S. PATENT DOCUMENTS

| | | | | |
|---|---|---|---|---|
| 4,429,626 | A * | 2/1984 | Ihara | A47J 19/025 100/117 |
| 4,803,390 | A * | 2/1989 | Bertram | A47J 43/08 310/112 |
| 5,156,872 | A * | 10/1992 | Lee | A23N 1/00 100/117 |
| 5,355,784 | A * | 10/1994 | Franklin | A47J 19/027 241/199.12 |
| 5,592,873 | A | 1/1997 | Lee | |
| 2009/0301318 | A1* | 12/2009 | Torrisi | A47J 19/02 99/503 |
| 2012/0325946 | A1* | 12/2012 | Charles | A47J 19/06 241/79 |
| 2014/0096690 | A1* | 4/2014 | Kim | A23N 1/02 99/513 |
| 2016/0021924 | A1* | 1/2016 | Kim | A23N 1/02 99/513 |

FOREIGN PATENT DOCUMENTS

| | | |
|---|---|---|
| CN | 203447058 U | 2/2014 |
| CN | 203743314 U | 7/2014 |
| CN | 204071657 U | 1/2015 |
| CN | 204427596 U | 7/2015 |
| CN | 204483800 | 7/2015 |
| CN | 204520410 U | 8/2015 |
| CN | 204683292 U | 10/2015 |
| CN | 105433824 A | 3/2016 |
| CN | 206062848 U | 4/2017 |
| FR | 2839255 A1 | 11/2003 |
| JP | 60126126 A | 7/1985 |
| JP | 3075533 U | 2/2001 |
| JP | 3092877 U | 4/2003 |
| KR | 20110004554 U | 5/2011 |
| KR | 1020140033543 A | 3/2014 |
| KR | 101485401 B1 | 1/2015 |
| KR | 1020150053028 A | 5/2015 |
| WO | 2016085153 A1 | 6/2016 |

OTHER PUBLICATIONS

EP Search Report dated Jul. 5, 2019 in the corresponding EP application (application No. 17823422.5).
The 2nd Office Action dated Mar. 19, 2020 in the corresponding CN application No. 201610533189.X.
The first Office Action of JP application No. 2018-567115.
The first Office Action of KR Application No. 10-2019-7000167.
International Search Report dated May 22, 2017 in the corresponding PCT application (application No. PCT/CN2017/074760).

* cited by examiner

SQUEEZING THREADED ROD, SQUEEZING COMPONENT, AND FOOD PROCESSOR

CROSS-REFERENCES TO RELATED APPLICATIONS

The present application is continuation of international application PCT/CN2017/074760, filed on Feb. 24, 2017, which claims the priority to Chinese Application No. 201610533189X, filed with the Chinese Patent Office on Jul. 6, 2016, and entitled "SQUEEZING THREADED ROD, SQUEEZING COMPONENT AND FOOD PROCESSOR", and Chinese Application No. 2016207149505, filed with the Chinese Patent Office on Jul. 6, 2016, and entitled "SQUEEZING THREADED ROD, SQUEEZING COMPONENT AND FOOD PROCESSOR", all of which are incorporated herein by reference in their entirety.

FIELD

The present disclosure relates to the field of kitchen utensils, and more specifically relates to a squeezing threaded rod, a squeezing component and a food processor.

BACKGROUND OF THE INVENTION

Juicers existing on the market extrude juice and discharge residues through spiral heads and rubber plugs installed on the bottom of juicing cups, but as the stress direction of residue discharge is inconsistent with the rotation thrust direction of the spiral heads, the juice squeezing force and the residue discharge force are insufficient, and thus the phenomena that residue discharge openings are blocked and that the residues are not dry occur frequently.

Therefore, how to propose a juicer in which the stress direction of juice squeezing and residue discharge is consistent with the thrust direction of a rod body so as to avoid the phenomena that residues are not dry and that a residue discharge opening is blocked easily has become an urgent problem to be solved at present.

BRIEF SUMMARY OF THE INVENTION

The present disclosure aims at solving at least one of the technical problems in the prior art or related art.

Embodiments provide a squeezing threaded rod.

Another embodiment of the present disclosure is to provide a squeezing component.

Yet another embodiment of the present disclosure is to provide a food processor.

In view of this, the embodiment of the present disclosure provides a squeezing threaded rod, comprising: a rod body which comprises a feeding segment, a squeezing segment connected with the feeding segment and a residue discharge segment connected with the squeezing segment; and the area of the cross section of the rod body gradually increases from the feeding segment to the squeezing segment.

According to the squeezing threaded rod provided by the embodiment of the present disclosure, the rod body of the squeezing threaded rod includes the feeding segment, the squeezing segment and the residue discharge segment, which are connected in sequence, the stress direction of residue discharge is along the axial direction of the rod body, and the thrust direction of the rod body is also along the axial direction of the rod body, therefore the stress direction of juice squeezing and residue discharge of the squeezing threaded rod is consistent with the thrust direction of the rod body, in this case, the juice squeezing force and the residue discharge force can be increased, the food residues at a residue discharge opening can be discharged more easily, then the phenomenon that the food residues block the residue discharge opening can be reduced, meanwhile as the juice squeezing force is increased, more food juice is extruded out, therefore the juice yield of food can be improved on one hand, on the other hand, since the food juice contained in the food residues is less, the food residues can be drier, and then the phenomenon that the food residues are not dry can be avoided. Meanwhile, the area of the cross section of the rod body gradually increases from the feeding segment to the squeezing segment, that is, the rod body gradually becomes thicker from the feeding segment to the squeezing segment, by means of this setting, when the squeezing threaded rod is installed in a first barrel body of a food processor, the squeezing threaded rod is matched with an inner wall of the first barrel body to form a squeezing passage to clamp and extrude the food, since the rod body gradually becomes thicker from the feeding segment to the squeezing segment, the squeezing passage formed by the squeezing threaded rod and the inner wall of the first barrel body can gradually become narrow, and thus the squeezing force of the squeezing threaded rod and the inner wall of the first barrel body applied to the food can be increased to improve the juice yield.

In the above-mentioned embodiments of the present disclosure, preferably, the squeezing threaded rod further comprises a mounting shaft, and the rod body is sheathed on the mounting shaft for mounting the rod body.

In the embodiments of the present disclosure, the driving connection between the squeezing threaded rod and a motor and other driving components can be realized by using the mounting shaft, so that the squeezing threaded rod can rotate under the drive of the motor and other driving components to separate juice of the food from residues.

In addition, the squeezing threaded rod in the above-mentioned embodiment provided by the present disclosure can further have the following additional technical features:

In the above-mentioned embodiments of the present disclosure, preferably, the area of the cross section of the residue discharge segment gradually decreases from one end close to the squeezing segment to one end away from the squeezing segment.

In the embodiments of the present disclosure, the area of the cross section of the squeezing threaded rod gradually decreases from one end close to the squeezing segment to one end away from the squeezing segment, that is to say, the rod body of the squeezing threaded rod gradually converges on the residue discharge segment, in this setting, the rod body of the squeezing threaded rod gradually converges on the residue discharge segment, so the gap between the residue discharge segment of the rod body and the inner side wall of the first barrel body is increased, then the resistance of the squeezing threaded rod and the first barrel body on the food can be reduced to ensure smooth discharge of the food, and thus the phenomenon that the food residues block the residue discharge opening can be prevented.

In the above-mentioned embodiments of the present disclosure, preferably, threads are arranged on the feeding segment and the squeezing segment of the rod body, and the thread pitch of the threads gradually decreases from the feeding segment to the squeezing segment.

In the embodiments of the present disclosure, the threads can form a spiral groove on the rod body, and thus the food can be guided to advance from the feeding segment to the squeezing segment and the residue discharge segment in sequence under the guidance of the spiral groove and is discharged from the residue discharge segment. Meanwhile, the thread pitch of the threads gradually decreases from the feeding segment to the squeezing segment, that is, the volume rate of the squeezing threaded rod gradually decreases, therefore the compression rate of the squeezing threaded rod on the food gradually increases, and thus this setting can also improve the juice squeezing force of the squeezing threaded rod to improve the juice yield.

In the above-mentioned embodiments of the present disclosure, preferably, the compression ratio of the squeezing threaded rod is A, the value of which is: more than or equal to 1.8 and less than or equal to 3.6, further preferably, the compression ratio A is within the range of 2.5-3, and the compression ratio of the screw refers to the ratio of the volume of the first thread pitch on the feeding segment to the volume of the last thread pitch on the squeezing segment, the thread pitch of the squeezing threaded rod refers to the distance between two adjacent threads along the axial direction of the rod body, and the volume of the thread pitch refers to the amount of food that can be accommodated in this distance.

In the above-mentioned embodiments of the present disclosure, a plurality of material pressing planes are arranged on the feeding segment of the rod body.

In the embodiments of the present disclosure, the rod segment between the first thread and the second thread on the feeding segment of the squeezing threaded rod is cut into planes so as to form the material pressing planes, thereby being more beneficial for the material pressing planes to guide crushed food to the first barrel body where the squeezing threaded rod is located.

In the above-mentioned embodiments of the present disclosure, a material baffle is arranged on the feeding segment, the threads extend from the material baffle toward the squeezing segment, and a guiding inclined plane is arranged on the surface of the material baffle close to the threads.

In the embodiments of the present disclosure, one material baffle can be arranged on the feeding segment, the material baffle forms a material accommodation cavity with the first thread, therefore the crushed food can directly drop into the material accommodation cavity, and moreover, as the guiding inclined plane is arranged on the surface of the material baffle close to the threads, the resistance of the material baffle on the crushed food can be reduced, thereby being beneficial for the crushed food to enter the material accommodation cavity.

In the above-mentioned embodiments of the present disclosure, the width of one end of the thread connected with the rod body is D1, the value of which is: more than or equal to 5 mm and less than or equal to 12.99 mm.

In the embodiments of the present disclosure, as the width of one end (i.e., the root of the thread) of the thread connected with the rod body is set to be within the range of being greater than or equal to 5 mm and being smaller than or equal to 12.99 mm, the thread and the rod body have a certain connecting width, therefore the connecting strength between the thread and the rod body can be improved, as a result, the situation that the thread of the squeezing threaded rod breaks in a juice squeezing and residue discharge process can be prevented, then the overall strength of the squeezing threaded rod can be improved, and the service life of the squeezing threaded rod is prolonged.

In the above-mentioned embodiments of the present disclosure, the width of one end of the thread away from the rod body is D2, and the value of the D2 is more than or equal to 1 mm and less than or equal to 4.99 mm.

In the embodiments of the present disclosure, as the width of one end (i.e., the end part of the thread) of the thread away from the rod body is set to be within the range of being greater than or equal to 1 mm and being smaller than or equal to 4.99 mm, the width of the end part of the thread is smaller, therefore the crushed food can be guided more quickly to move from the feeding segment toward the squeezing segment and the residue discharge segment in sequence along the squeezing threaded rod, and thus the juice squeezing and residue discharge efficiency of the squeezing threaded rod can be improved.

In the above-mentioned embodiments of the present disclosure, the projection height of the thread in the radial direction of the rod body is H, the value of which is more than or equal to 0.5 mm and less than or equal to 13.99 mm.

In the embodiments of the present disclosure, as the projection height of the thread in the radial direction of the rod body is set to be within the range of being greater than or equal to 0.5 mm and being smaller than or equal to 13.99 mm, on one hand, the thread has a certain height, therefore the thread and the rod body can be enclosed to form a spiral groove with a certain volume, the crushed food enters the spiral groove from the feeding segment and gradually moves toward the discharging segment along the spiral groove, then juice squeezing and residue discharge can be accomplished, meanwhile, as the projection height of the thread in the radial direction of the rod body is set to be within the range of being greater than or equal to 0.5 mm and being smaller than or equal to 13.99 mm, the height of the thread will not be too large, accordingly the overall strength of the thread can be guaranteed, therefore the squeezing degree of the squeezing threaded rod on the food can be properly improved to improve the juice yield of the food, meanwhile, after the strength of the thread is improved, the overall strength of the squeezing threaded rod can also be improved, and the service life of the squeezing threaded rod is prolonged.

The embodiment of the present disclosure provides a squeezing component for a food processor, the squeezing component includes: a first barrel body, and a feed inlet is arranged at one end of the first barrel body, a residue discharge opening is arranged at the other end of the first barrel body, and a juice discharge opening is formed on a side wall of the first barrel body; and the squeezing threaded rod provided by any embodiment, and the squeezing threaded rod is rotatably installed in the first barrel body, the feeding segment of the squeezing threaded rod is matched with the feed inlet, the residue discharge segment of the squeezing threaded rod is matched with the residue discharge opening, the juice discharge opening being formed on the side wall of the first barrel body corresponding to the squeezing segment of the squeezing threaded rod.

The squeezing component provided by the embodiment of the present disclosure can be used for the food processor including a crushing component, therefore the food can be crushed by using the crushing component, the crushed food enters the squeezing component from the feed inlet, the squeezing component accomplishes the juice squeezing and residue discharge process, that is, the crushing process and the juice squeezing and residue discharge process of the food are separately performed, the crushing component mainly extrudes juice and discharges residues by using the squeezing threaded rod provided by any embodiment, and thus the squeezing component provided by the embodiment of the present disclosure has all beneficial effects of the squeezing threaded rod provided by any one of the above-mentioned embodiments.

In the above-mentioned embodiments of the present disclosure, a residue discharge inclined plane extending toward the residue discharge opening is arranged on the inner side wall of the first barrel body corresponding to the residue discharge opening, and the residue discharge inclined plane is used for guiding the food residues to the residue discharge opening.

In the embodiments of the present disclosure, the wall of the first barrel body provided with the residue discharge opening can be set into the inclined plane to form the residue discharge inclined plane, therefore the food residues can be guided to the residue discharge opening by the residue discharge inclined plane and are smoothly discharged from the residue discharge opening, and thus the phenomenon that the food residues block the residue discharge opening easily can be effectively relieved.

In the above-mentioned embodiments of the present disclosure, the feeding segment of the squeezing threaded rod is located below the feed inlet; and the projection width L1 of the feed inlet in the radial direction of the squeezing threaded rod is greater than the diameter of the feeding segment, and the projection length of the feed inlet in the axial direction of the squeezing threaded rod is L2, the value of which is: more than or equal to 3.8 mm and less than or equal to 19.9 mm.

In the embodiments of the present disclosure, as the feed inlet and the feed end are arranged up and down, the crushed food can enter the squeezing component at least by the gravity of the crushed food, so that the juice squeezing and residue discharge of the crushed food can be realized by using the squeezing component, meanwhile, the size of the feed inlet can also be reasonably set through the size of the rod body at the feeding segment, so that the crushed food enters the feeding segment of the rod body more easily, and the projection width of the feed inlet in the radial direction of the squeezing threaded rod is greater than the diameter of the feeding segment, specifically, for example, the projection width of the feed inlet in the radial direction of the squeezing threaded rod is equal to the diameter of the screw of the feeding segment plus 1-5 mm, and the projection length L2 of the feed inlet in the axial direction of the squeezing threaded rod is preferably within the range of 3.8-19.9 mm.

In the above-mentioned embodiments of the present disclosure, the material baffle stretches into the feed inlet, and the distance E between the material baffle and the end face of the feed inlet away from the squeezing threaded rod is within the range of 1-10 mm.

In the above-mentioned embodiments of the present disclosure, a filter sheet is arranged at the juice discharge opening, and the filter sheet is in contact with the threads of the squeezing threaded rod, or a gap a is arranged between the filter sheet and the threads of the squeezing threaded rod, and the gap a is smaller than the sizes of the granules of the food residues.

In the embodiments of the present disclosure, the filter sheet is arranged to prevent the food residues from being discharged from the juice discharge opening, meanwhile the distance between the filter sheet and the squeezing threaded rod can also be reasonably set according to the sizes of the granules of the food residues, so that the automatic cleaning of the filter sheet can be realized by the friction between the squeezing threaded rod and the filter sheet.

In the above-mentioned embodiments of the present disclosure, the value of the gap is more than or equal to 0.2 mm and less than or equal to 5 mm.

In the embodiments of the present disclosure, the value of the gap a is set to be within the range of 0.2-5 mm, after beans and other food are crushed or cut up in daily life, the sizes of the granules of the food residues thereof are generally 0.1-3 mm or so, specifically different kinds of food have difference, so the gap a is set to be within the range of 0.2-5 mm so as to adapt to the size s of the food residues of the processed food, and thus the automatic cleaning of the food residues on the filter sheet can be realized by the friction between the squeezing threaded rod and the filter sheet.

In one embodiment, the filter sheet is a metal filter sheet, because the hardness and the wear resistance of the metal filter sheet are relatively good, so when the filter sheet is cleaned by the squeezing threaded rod, the situation that the filter sheet is damaged due to insufficient strength can be prevented.

In the above-mentioned embodiments of the present disclosure, the filter sheet and the first barrel body are of an integral structure or the filter sheet is detachably installed at the juice discharge opening. On the principle of preventing the food residues from being discharged from the juice discharge opening, the filter sheet and the first barrel body can be set into the integral structure, of course, the filter sheet is also detachably arranged at the juice discharge opening of the first barrel body, and since the filter sheet is detachably arranged at the juice discharge opening, the filter sheet can be maintained and replaced easily.

In the above-mentioned embodiments of the present disclosure, a squeezing sheet is arranged at the residue discharge opening.

In the embodiments of the present disclosure, the squeezing sheet is arranged at the residue discharge opening to further extrude the food, so that the juice-residue separation of the food is more thorough, then more food juice can be extruded, and thus the juice yield of the food processor can be improved.

The embodiment of the third aspect of the present disclosure provides a food processor, comprising: a feed opening; a crushing component which comprises a second barrel body and a crushing device located in the second barrel body, and the second barrel body communicates with the feed opening, and the crushing device is used for crushing food; the squeezing component in any embodiment of the second aspect, and the second barrel body and the feed inlet of the squeezing component communicate with each other; and a host component, on which the crushing component and the squeezing component are installed, and the host component comprises a driving component, which is used for driving the crushing device to crush the food and is used for driving the squeezing threaded rod of the squeezing component to extrude juice and discharge residues.

According to the food processor provided by the embodiment of the present disclosure, after the food enters the second barrel body from the feed opening, the food is crushed by the match of the crushing device and the side wall of the second barrel body, and the crushed food enters the first barrel body from the feed inlet under the action of the crushing device and is extruded by the squeezing threaded rod to separate the juice of the food from the residues. In the embodiments of the present disclosure, the crushing process and the juice squeezing and residue discharge process of the food are separately performed, no juice squeezing or residue discharge is required in the crushing process, therefore no filter screen or a rotary brush and other components need to be arranged in the second barrel body, so that the food in the second barrel body can be crushed under the combined action of the second barrel body and the crushing device, meanwhile, the squeezing threaded rod can be approximately horizontally arranged in the juice squeezing and residue discharge process, that is, a juice squeezing and residue discharge system can be set to be horizontal, accordingly the juice and residues of the food can be conveniently separated, this setting can ensure the juice yield of the food processor on one hand, and can avoid the use of the filter screen, the rotary brush and other parts and components on the other hand, in this case, the food processor is simple in structure and is easy to install, meanwhile as the filter screen is omitted, the cleaning difficulty of the user can be reduced, and then the user experience can be improved.

In the above-mentioned embodiments of the present disclosure, the size of the second barrel body gradually decreases from one end close to the feed opening to the other end close to the feed inlet.

In the embodiments of the present disclosure, the second barrel body can be set into a shape having a large upper part and a small lower part, specifically, if the second barrel body is circular, the diameter of the second barrel body gradually decreases from top to bottom, and if the second barrel body is not circular, the width and the length of the cross section of the second barrel body gradually decrease from top to bottom. Due to this setting, the food can be cut smaller and smaller, specifically, for example, when the food just enters the second barrel body, the granules of the food are greater, the distance between the inner side wall of the second barrel body and the crushing device adapts to the granules of the food, the food is gradually crushed to smaller granules and gradually moves toward the feed inlet under the action of the crushing device and the second barrel body, so the gap close to the feed inlet is set to be smaller, in this case, the gap can adapt to the sizes of the granules of the food here on one hand, the food here can be further crushed to smaller granules under the action of the crushing device on the other hand, accordingly step-by-step sufficient crushing of the food can be realized, and then the juice yield of the food can be improved.

In the above-mentioned embodiments of the present disclosure, the driving component comprises: a motor, on which a motor shaft is arranged; a transmission component, at least comprising: a first transmission part, in driving connection with the motor shaft, and a first driving shaft is arranged on the first transmission part, and the first driving shaft is connected with the crushing device and is used for driving the crushing device to crush the food; and a second transmission part, in driving connection with the motor shaft, and a second driving shaft is arranged on the second transmission part, and the second driving shaft is connected with the squeezing threaded rod and is used for driving the squeezing threaded rod to extrude juice and discharge residues; and the first driving shaft is vertically arranged, the first driving shaft forms a preset angle $\beta$ with the second driving shaft, the value of which is more than or equal to 60° and less than or equal to 135°.

In the embodiments of the present disclosure, two or more driving shafts can simultaneously drive the crushing device and the squeezing threaded rod by means of the transmission of the same motor and the transmission component, that is, the driving component drives a plurality of shafts, including two or more shafts, by the same motor, the driving shafts can be realized by the same reduction gearbox or different reduction gearboxes, and specifically, the direction can be changed in a transmission manner of different gears or other transmission manners, such as transmission of a helical bevel gear, a turbine and worm, a staggered shaft helical gear and the like, in order to realize preset angle output among the plurality of driving shafts. In addition, the first driving shaft and the second driving shaft can rotate on the same direction, for example, rotating clockwise or rotating counterclockwise, of course, the first driving shaft and the second driving shaft can also rotate oppositely, and specifically, for example, one rotates clockwise and the other rotates counterclockwise. In one embodiment, the preset angle $\beta$ is greater than or equal to 65° and is smaller than or equal to 135°, and further the preset angle $\beta$ is greater than or equal to 70° and is smaller than or equal to 120°, and specifically, for example, the preset angle $\beta$ is 90°.

In the above-mentioned embodiments of the present disclosure, the crushing device is a grinding spiral head or a cutting knife.

In the embodiments of the present disclosure, the food can be crushed and pushed into the second barrel body by using the grinding spiral head or the cutting knife, and meanwhile, juice squeezing and residue discharge can be realized by using the squeezing threaded rod.

In the above-mentioned embodiments of the present disclosure, a rotating speed ratio of the first driving shaft to the second driving shaft is C, and the value of the rotating speed ratio C is: $2/3 \leq C \leq 3$.

In the embodiments of the present disclosure, the parameters of the first transmission part and the second transmission part can be reasonably selected to control the rotating speed ratio of the first driving shaft to the second driving shaft, so that the rotating speeds of the first driving shaft and the second driving shaft can adapt to specific application occasions. Specifically, for example, when the crushing device is the grinding spiral head, the rotating speed ratio of the first driving shaft to the second driving shaft is within the range of 0.8-1.5, specifically, for example, when the rotating speed of the grinding spiral head is 60 RPM, the rotating speed of the squeezing threaded rod is set to 48-90 RPM. When the crushing device is the cutting knife, the rotating speed ratio of the first driving shaft to the second driving shaft is within the range of 1-3, specifically, for example, when the rotating speed of the squeezing threaded rod is set to 60 RPM, the rotating speed of the cutting knife is 60-180 RPM.

In the above-mentioned embodiments of the present disclosure, the first transmission part and the second transmission part are bevel gears which are engaged with each other; or the first transmission part is a turbine, and the second transmission part is a worm; or the first transmission part and the second transmission part are two helical gears whose shafts are arranged to be stagger to each other.

In the embodiments of the present disclosure, when the output direction of the motor is changed into multi-shaft and multi-angle output by using the transmission component, the first transmission part and the second transmission part can select a plurality of transmission manners, specifically, for example, the transmission manner of the bevel gear and the bevel gear, of course, can also be the transmission manner of the turbine and the worm, and of course, can also be the transmission manners of stagger shaft helical gears, etc.

In the above-mentioned embodiments of the present disclosure, the transmission component further includes: a shell, and the shell includes an upper shell and a lower shell, which are assembled together, the upper shell and the lower shell are enclosed to form an installation cavity, the first transmission part and the second transmission part are located in the installation cavity, and the first driving shaft and the second driving shaft extend out from the shell.

In the embodiments of the present disclosure, the first transmission part, the second transmission part, the first driving shaft and the second driving shaft can be installed in the shell, therefore during specific use, the transmission component can be moved and replaced as an entirety.

In the above-mentioned embodiments of the present disclosure, the transmission component further includes a deceleration component arranged between the first transmission part and the motor shaft and used for reducing the rotating speed of the motor shaft to a rotating speed necessary for the first driving shaft and the second driving shaft.

In the above-mentioned embodiments of the present disclosure, the food processor further comprising: a feeding barrel, arranged on the second barrel body, and the feed opening is arranged on the feeding barrel.

In the embodiments of the present disclosure, a feeding barrel can be specially arranged for controlling the feeding of the food, and at this time, the feed opening is arranged at the feeding barrel.

In another embodiments of the present disclosure, of course, no feeding barrel is arranged, and the food is directly placed in the second barrel body at one time, at this time, a lid capable of being opened or closed is arranged on the second barrel body, and the feed opening is the opening of the second barrel body.

In the above-mentioned embodiments of the present disclosure, the host component further includes a base and an enclosure, and the enclosure and the base are enclosed to form an accommodation cavity, and the driving component is installed on the base and is located in the accommodation cavity.

In the above-mentioned embodiments of the present disclosure, the host component further includes a control module used for controlling working parameters of the food processor, specifically, for example, the rotating speeds of the crushing device and the squeezing threaded rod, and the like, of course, a program module can also be provided to realize intelligent program control of the food processor, and specifically, for example, a cleaning program module, a plurality of juicing program modules and the like can be provided to realize the intelligent juicing and intelligent cleaning of the food processor.

In the above-mentioned embodiments of the present disclosure, the host component further includes a power supply module, and the power supply module is used for supplying power for the parts and components of the food processor, for example, the driving component, and the power supply module at least includes a power plug that can be plugged into the mains supply, and thus, during specific use, the power plug can be directly connected with the mains supply so as to supply power for the food processor.

In the above-mentioned embodiments of the present disclosure, the food processor includes a juicer and a juice extractor.

Embodiments of the present disclosure will be become apparent in the description below, or may be learned by the practice of the present disclosure.

BRIEF DESCRIPTION OF THE DRAWINGS

Embodiments of the present disclosure will become apparent and be understood easily from the following description of the embodiments in conjunction with the accompanying drawings, in which.

The corresponding relation between reference signs in FIG. 1 to FIG. 10 and component names is as follows:

11 second barrel body, 12 first barrel body, 121 juice discharge opening, 122 residue discharge opening, 123 residue discharge inclined plane, 13 crushing device, 14 squeezing threaded rod, 141 rod body, 1411 feeding segment, 1412 squeezing segment, 1413 residue discharge segment, 142 thread, 143 material baffle, 144 material pressing plane, 15 filter sheet, 16 squeezing sheet, 17 feeding barrel, 18 feed inlet, 2 host component, 21 driving component, 211 motor, 212 first transmission part, 213 first driving shaft, 214 second transmission part, 215 second driving shaft, 216 lower shell, 217 upper shell, 218 deceleration component, 22 base, and 23 enclosure.

DETAILED DESCRIPTION OF THE INVENTION

Embodiments of the present disclosure can be understood more clearly, a further detailed description of the present disclosure will be given below in combination with accompanying drawings and specific embodiments. It should be noted that the embodiments of the present application and the features in the embodiments can be combined with one another with no conflict.

In the following description, numerous specific details are set forth in order to provide a thorough understanding of the present disclosure. However, the present disclosure can also be implemented in other manners different from those described herein. Therefore, the protection scope of the present disclosure is not limited to the specific embodiments disclosed below.

A squeezing threaded rod, a squeezing component and a food processor provided according to some embodiments of the present disclosure are described below with reference to FIG. 1 to FIG. 10.

Figure 1:
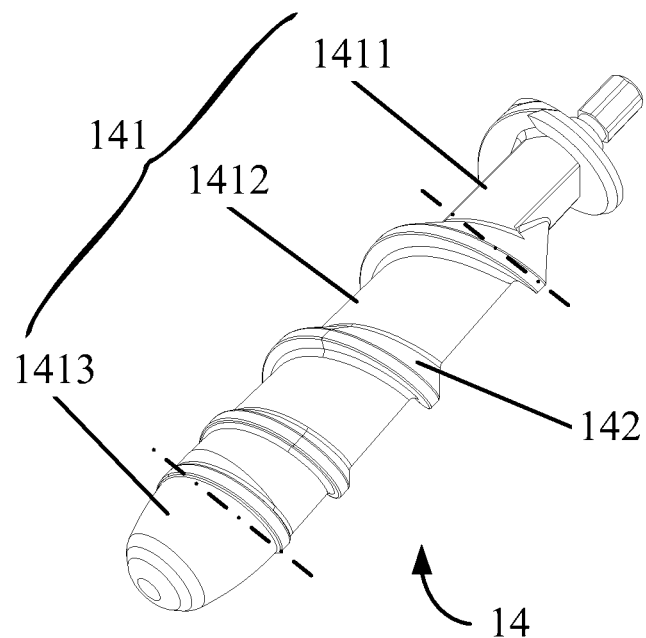
FIG. 1 is a structural schematic diagram of the squeezing threaded rod in one embodiment of the present disclosure.
Figure 2:
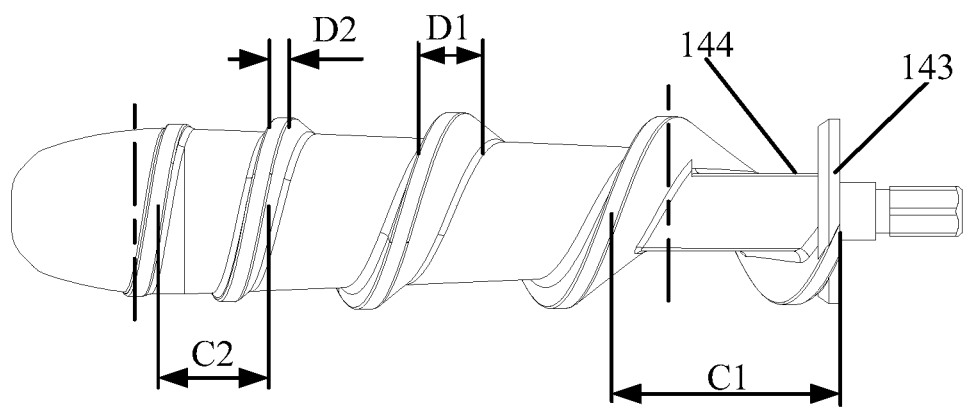
FIG. 2 is another structural schematic diagram of the squeezing threaded rod in one embodiment of the present disclosure.
Figure 3:
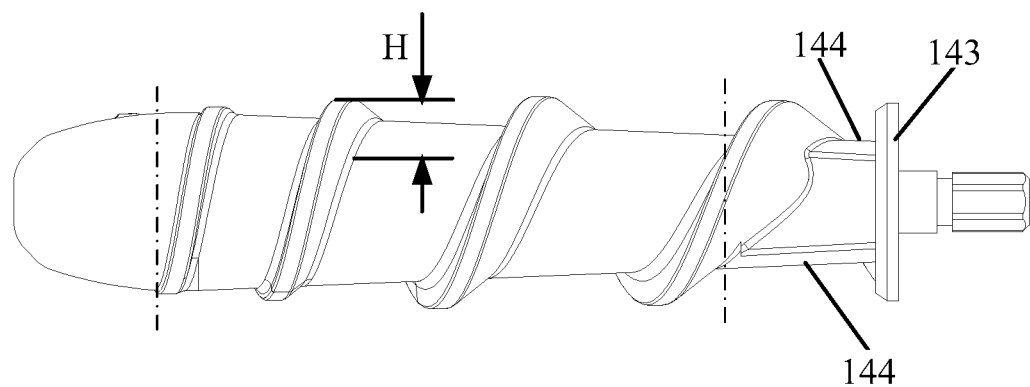
FIG. 3 is yet another structural schematic diagram of the squeezing threaded rod in one embodiment of the present disclosure.

As shown in FIG. 1 to FIG. 3, the embodiment of the present disclosure provides a squeezing threaded rod 14, including: a rod body 141, and the rod body 141 includes a feeding segment 1411, a squeezing segment 1412 connected with the feeding segment 1411 and a residue discharge segment 1413 connected with the squeezing segment 1412; and the area of the cross section of the rod body 141 gradually increases from the feeding segment 1411 to the squeezing segment 1412.

According to the squeezing threaded rod 14 provided by the embodiment of the present disclosure, the rod body 141 of the squeezing threaded rod 14 includes the feeding segment 1411, the squeezing segment 1412 and the residue discharge segment 1413, which are connected with one another in sequence, the stress direction of residue discharge is along the axial direction of the rod body 141, and the thrust direction of the rod body 141 is also along the axial direction of the rod body 141, therefore the stress direction of juice squeezing and residue discharge of the squeezing threaded rod 14 is consistent with the thrust direction of the rod body 141, in this case, the juice squeezing force and the residue discharge force can be increased, the food residues at a residue discharge opening 122 can be discharged more easily, then the phenomenon that the food residues block the residue discharge opening 122 can be reduced, meanwhile as the juice squeezing force is increased, more food juice is extruded out, therefore the juice yield of food can be improved on one hand, on the other hand, since the food juice contained in the food residues is less, the food residues can be drier, and then the phenomenon that the food residues are not dry can be avoided. Meanwhile, the area of the cross section of the rod body 141 gradually increases from the feeding segment 1411 to the squeezing segment 1412, that is, the rod body 141 gradually becomes thicker from the feeding segment 1411 to the squeezing segment 1412, by means of this setting, when the squeezing threaded rod 14 is installed in a first barrel body 12 of a food processor, the squeezing threaded rod 14 is matched with an inner wall of the first barrel body 12 to form a squeezing passage to clamp and extrude the food, since the rod body 141 gradually becomes thicker from the feeding segment 1411 to the squeezing segment 1412, the squeezing passage formed by the squeezing threaded rod 14 and the inner wall of the first barrel body 12 can gradually become narrow, and thus the squeezing force of the squeezing threaded rod 14 and the inner wall of the first barrel body 12 on the food can be increased to improve the juice yield.

A dotted line in FIG. 1 to FIG. 3 is a boundary between the feeding segment 1411 and the squeezing segment 1412 or between the squeezing segment 1412 and the residue discharge segment 1413 of the squeezing threaded rod 14.

In the above-mentioned embodiments of the present disclosure, the squeezing threaded rod 14 further includes a mounting shaft, and the rod body 141 is sheathed on the mounting shaft for mounting the rod body.

In the embodiments of the present disclosure, the driving connection between the squeezing threaded rod 14 and a motor and other driving components can be realized by using the mounting shaft, so that the squeezing threaded rod 14 can rotate under the drive of the motor and other driving components to separate juice of the food from residues.

In the above-mentioned embodiments of the present disclosure, as shown in FIG. 1 to FIG. 3, the area of the cross section of the residue discharge segment 1413 gradually decreases from one end close to the squeezing segment 1412 to one end away from the squeezing segment 1412.

In the embodiments of the present disclosure, the area of the cross section of the squeezing threaded rod 14 gradually decreases from one end close to the squeezing segment 1412 to one end away from the squeezing segment 1412, that is to say, the rod body 141 of the squeezing threaded rod 14 gradually converges on the residue discharge segment, in this setting, the rod body 141 of the squeezing threaded rod 14 gradually converges on the residue discharge segment, so the gap between the residue discharge segment of the rod body 141 and the inner side wall of the first barrel body 12 is increased, then the resistance of the squeezing threaded rod 14 and the first barrel body 12 on the food can be reduced to ensure smooth discharge of the food, and thus the phenomenon that the food residues block the residue discharge opening 122 can be prevented.

In the above-mentioned embodiments of the present disclosure, as shown in FIG. 1 to FIG. 3, threads 142 are arranged on the feeding segment 1411 and the squeezing segment 1412 of the rod body 141, and the thread pitch of the threads 142 gradually decreases from the feeding segment 1411 to the squeezing segment 1412.

In the embodiments of the present disclosure, the threads 142 can form a spiral groove on the rod body 141, and thus the food can be guided to advance from the feeding segment 1411 to the squeezing segment 1412 and the residue discharge segment 1413 in sequence under the guidance of the spiral groove and is discharged from the residue discharge segment 1413. Meanwhile, the thread pitch of the threads 142 gradually decreases from the feeding segment 1411 to the squeezing segment, that is, the volume rate of the squeezing threaded rod 14 gradually decreases, therefore the compression rate of the squeezing threaded rod 14 on the food gradually increases, and thus this setting can also improve the juice squeezing force of the squeezing threaded rod 14 to improve the juice yield.

In the above-mentioned embodiments of the present disclosure, the compression ratio of the squeezing threaded rod 14 is A, the value of the compression ratio A is: $1.8 \leq A \leq 3.6$, further the compression ratio A is within the range of 2.5-3, and the compression ratio of the screw refers to the ratio of the volume of the first thread pitch C1 on the feeding segment 1411 to the volume of the last thread pitch C2 on the squeezing segment 1412, the thread pitch of the squeezing threaded rod 14 refers to the distance between two adjacent threads 142 along the axial direction of the rod body 141, and the volume of the thread pitch refers to the amount of food that can be accommodated in this distance.

In the above-mentioned embodiments of the present disclosure, as shown in FIG. 1 to FIG. 3, a plurality of material pressing planes 144 are arranged on the feeding segment 1411 of the rod body 141.

In the embodiments of the present disclosure, the rod segment between the first thread 142 and the second thread 142 on the feeding segment 1411 of the squeezing threaded rod 14 is cut into planes so as to form the material pressing planes 144, thereby being more beneficial for the material pressing planes 144 to guide crushed food to the first barrel body 12 where the squeezing threaded rod 14 is located.

In the above-mentioned embodiments of the present disclosure, as shown in FIG. 2 and FIG. 3, a material baffle 143 is arranged on the feeding segment 1411, the threads 142 extend from the material baffle 143 toward the squeezing segment 1412, and a guiding inclined plane is arranged on the surface of the material baffle 143 close to the threads 142.

In the embodiments of the present disclosure, one material baffle 143 can be arranged on the feeding segment 1411, the material baffle 143 forms a material accommodation cavity with the first thread 142, therefore the crushed food can directly drop into the material accommodation cavity, and moreover, as the guiding inclined plane is arranged on the surface of the material baffle 143 close to the threads 142, the resistance of the material baffle 143 on the crushed food can be reduced, thereby being beneficial for the crushed food to enter the material accommodation cavity.

In the above-mentioned embodiments of the present disclosure, the width of one end of the thread 142 connected with the rod body 141 is D1, and the value of the D1 is: 5 mm≤D1≤12.99 mm.

In the embodiments of the present disclosure, as the width of one end (i.e., the root of the thread 142) of the thread 142 connected with the rod body 141 is set to be within the range of being greater than or equal to 5 mm and being smaller than or equal to 12.99 mm, the thread 142 and the rod body 141 have a certain connecting width, therefore the connecting strength between the thread 142 and the rod body 141 can be improved, as a result, the situation that the thread 142 of the squeezing threaded rod 14 breaks in a juice squeezing and residue discharge process can be prevented, then the overall strength of the squeezing threaded rod 14 can be improved, and the service life of the squeezing threaded rod 14 is prolonged.

In the above-mentioned embodiments of the present disclosure, the width of one end of the thread 142 away from the rod body 141 is D2, and the value of the D2 is: 1 mm≤D2≤4.99 mm.

In the embodiments of the present disclosure, as the width of one end (i.e., the end part of the thread 142) of the thread 142 away from the rod body 141 is set to be within the range of being greater than or equal to 1 mm and being smaller than or equal to 4.99 mm, the width of the end part of the thread 142 is smaller, therefore the crushed food can be guided more quickly to move from the feeding segment toward the squeezing segment and the residue discharge segment in sequence along the squeezing threaded rod 14, and thus the juice squeezing and residue discharge efficiency of the squeezing threaded rod 14 can be improved.

In the above-mentioned embodiments of the present disclosure, the projection height of the thread 142 in the radial direction of the rod body 141 is H, and the value of the projection height H is: 0.5 mm≤H≤13.99 mm.

In the embodiments of the present disclosure, as the projection height of the thread 142 in the radial direction of the rod body 141 is set to be within the range of being greater than or equal to 0.5 mm and being smaller than or equal to 13.99 mm, on one hand, the thread 142 has a certain height, therefore the thread and the rod body 141 can be enclosed to form a spiral groove with a certain volume, the crushed food enters the spiral groove from the feeding segment and gradually moves toward the discharging segment along the spiral groove, then juice squeezing and residue discharge can be accomplished, meanwhile, as the projection height of the thread 142 in the radial direction of the rod body 141 is set to be within the range of being greater than or equal to 0.5 mm and being smaller than or equal to 13.99 mm, the height of the thread 142 will not be too large, accordingly the overall strength of the thread 142 can be guaranteed, therefore the squeezing degree of the squeezing threaded rod on the food can be properly improved to improve the juice yield of the food, meanwhile, after the strength of the thread 142 is improved, the overall strength of the squeezing threaded rod 14 can also be improved, and the service life of the squeezing threaded rod 14 is prolonged.

Figure 4:
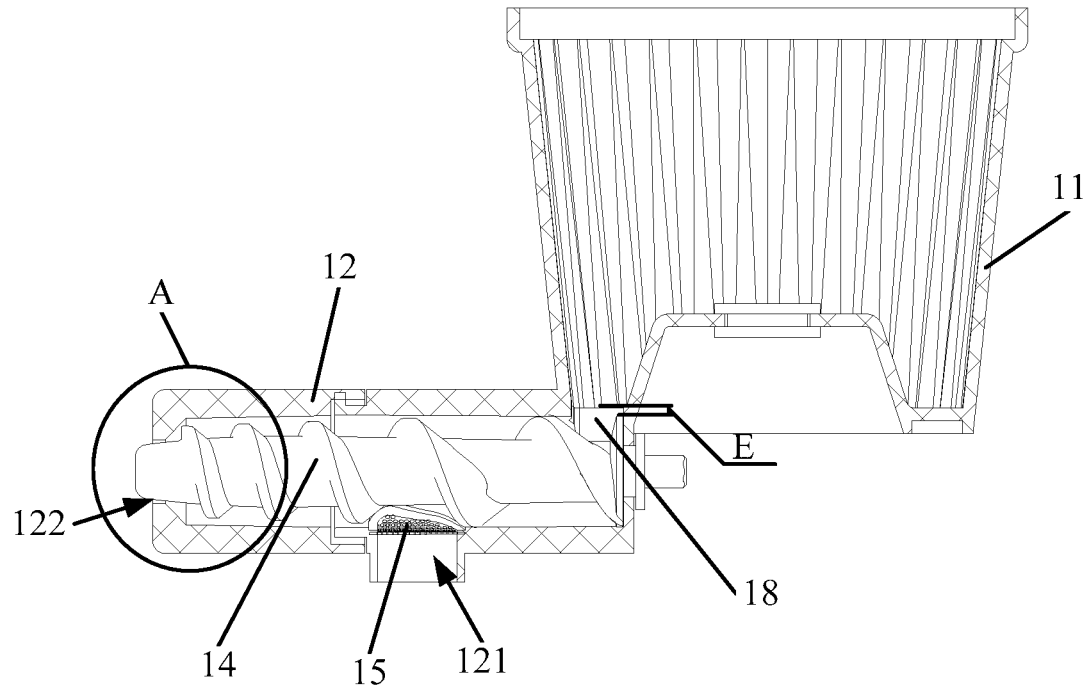
FIG. 4 is a structural schematic diagram of the squeezing component in one embodiment of the present disclosure.
Figure 5:
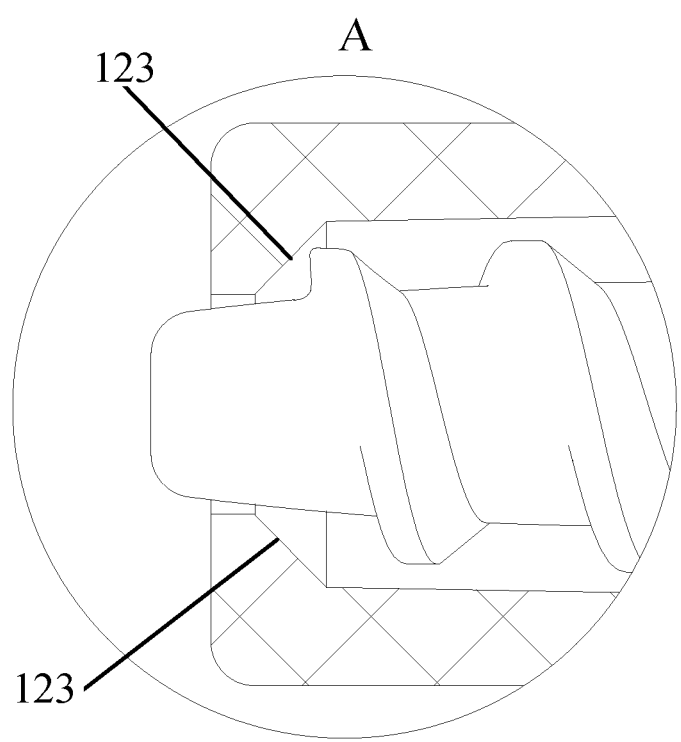
FIG. 5 is a schematic diagram of an amplified structure at A as shown in FIG. 4.
Figure 6:
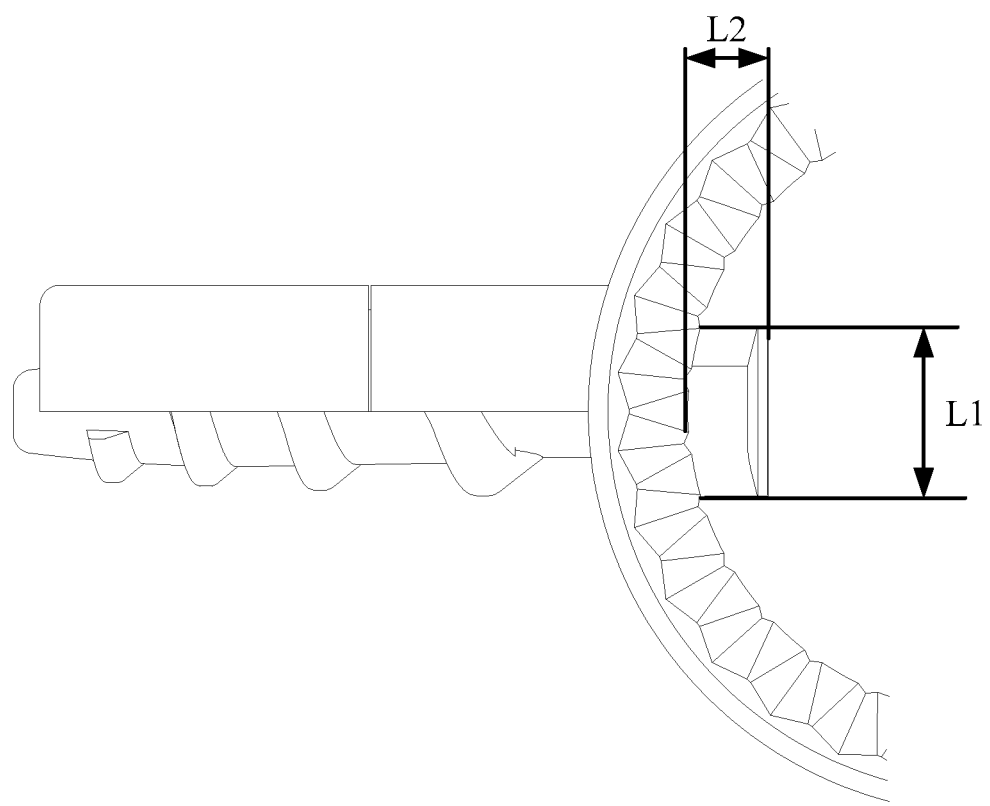
FIG. 6 is another structural schematic diagram of the squeezing component in one embodiment of the present disclosure.

As shown in FIG. 4 to FIG. 6, the embodiment of the present disclosure provides a squeezing component for a food processor, the squeezing component includes: a first barrel body 12, and a feed inlet 18 is arranged at one end of the first barrel body 12, a residue discharge opening 122 is arranged at the other end of the first barrel body 12, and a juice discharge opening 121 is arranged on a side wall of the first barrel body 12; and the squeezing threaded rod 14 provided by any embodiment, and the squeezing threaded rod 14 is rotatably installed in the first barrel body 12, the feeding segment 1411 of the squeezing threaded rod 14 is matched with the feed inlet 18, the residue discharge segment 1413 of the squeezing threaded rod 14 is matched with the residue discharge opening 122, and the juice discharge opening 121 is arranged on the side wall of the first barrel body 12 corresponding to the squeezing segment 1412 of the squeezing threaded rod 14.

The squeezing component provided by the embodiment of the present disclosure can be applied to the food processor including a crushing component, therefore the food can be crushed by using the crushing component, the crushed food enters the squeezing component from the feed inlet 18, the squeezing component accomplishes the juice squeezing and residue discharge process, that is, the crushing process and the juice squeezing and residue discharge process of the food are separately performed, the crushing component mainly extrudes juice and discharges residues by using the squeezing threaded rod 14 provided by any embodiment, and thus the squeezing component provided by the embodiment of the present disclosure has all beneficial effects of the squeezing threaded rod 14 provided by any one of the above-mentioned embodiments.

In the above-mentioned embodiments of the present disclosure, as shown in FIG. 4 and FIG. 5, a residue discharge inclined plane 123 extending toward the residue discharge opening 122 is arranged on the inner side wall of the first barrel body 12 corresponding to the residue discharge opening, and the residue discharge inclined plane 123 is used for guiding the food residues to the residue discharge opening 122.

In the embodiments of the present disclosure, the wall of the first barrel body 12 provided with the residue discharge opening 122 can be set into the inclined plane to form the residue discharge inclined plane 123, therefore the food residues can be guided to the residue discharge opening 122 by the residue discharge inclined plane 123 and are smoothly discharged from the residue discharge opening 122, and thus the phenomenon that the food residues block the residue discharge opening 122 easily can be effectively relieved.

In the above-mentioned embodiments of the present disclosure, as shown in FIG. 4, the material baffle stretches into the feed inlet 18, and the distance E between the material baffle and the end face of the feed inlet away from the squeezing threaded rod 14 is within the range of 1-10 mm.

In the above-mentioned embodiments of the present disclosure, as shown in FIG. 4 to FIG. 6, the feeding segment 1411 of the squeezing threaded rod 14 is located below the feed inlet 18; the projection width L1 of the feed inlet 18 in the radial direction of the squeezing threaded rod 14 is greater than the diameter of the feeding segment 1411, the projection length of the feed inlet 18 in the axial direction of the squeezing threaded rod 14 is L2, and the value of the projection length L2 is: 3.8 mm≤L2≤19.9 mm.

In the embodiments of the present disclosure, as the feed inlet 18 and the feed end are arranged up and down, the crushed food can enter the squeezing component at least by the gravity of the crushed food, so that the juice squeezing and residue discharge of the crushed food can be realized by using the squeezing component, meanwhile, the size of the feed inlet 18 can also be reasonably set through the size of the rod body 141 at the feeding segment 1411, so that the crushed food enters the feeding segment 1411 of the rod body 141 more easily, and the projection width of the feed inlet 18 in the radial direction of the squeezing threaded rod 14 is greater than the diameter of the feeding segment 1411, specifically, for example, the projection width of the feed inlet 18 in the radial direction of the squeezing threaded rod 14 is equal to the diameter of the screw of the feeding segment 1411 plus 1-5 mm, and the projection length L2 of the feed inlet 18 in the axial direction of the squeezing threaded rod 14 is preferably within the range of 3.8-19.9 mm.

In the above-mentioned embodiments of the present disclosure, as shown in FIG. 4, a filter sheet 15 is arranged at the juice discharge opening 121, the filter sheet 15 is in contact with the threads 142 of the squeezing threaded rod 14, or a gap a is arranged between the filter sheet 15 and the threads 142 of the squeezing threaded rod 14, and the gap a is smaller than the sizes of the granules of the food residues.

In the embodiments of the present disclosure, the filter sheet 15 is arranged to prevent the food residues from being discharged from the juice discharge opening 121, meanwhile the distance between the filter sheet 15 and the squeezing threaded rod 14 can also be reasonably set according to the sizes of the granules of the food residues, so that the automatic cleaning of the filter sheet 15 can be realized by the friction between the squeezing threaded rod 14 and the filter sheet 15.

In the above-mentioned embodiments of the present disclosure, the value of the gap a is: 0.2 mm≤a≤5 mm.

In the embodiments of the present disclosure, the value of the gap a is set to be within the range of 0.2-5 mm, after beans and other food are crushed or cut in daily life, the sizes of the granules of the food residues thereof are generally 0.1-3 mm or so, specifically different kinds of food have difference, so the gap a is set to be within the range of 0.2-5 mm so as to adapt to the size of the food residues of the processed food, and thus the automatic cleaning of the food residues on the filter sheet 15 can be realized by the friction between the squeezing threaded rod 14 and the filter sheet 15.

In one embodiment, the filter sheet 15 is a metal filter sheet, and the hardness and the wear resistance of the metal filter sheet are relatively good, so when the filter sheet 15 is cleaned by the squeezing threaded rod 14, the situation that the filter sheet is damaged due to insufficient strength can be prevented.

In the above-mentioned embodiments of the present disclosure, the filter sheet 15 and the first barrel body 12 are of an integral structure or the filter sheet 15 is detachably installed at the juice discharge opening 121. On the principle of preventing the food residues from being discharged from the juice discharge opening 121, the filter sheet 15 and the first barrel body 12 can be set into the integral structure, of course, the filter sheet 15 can also be detachably arranged at the juice discharge opening 121 of the first barrel body 12, and since the filter sheet 15 is detachably arranged at the juice discharge opening 121 of the first barrel, the filter sheet 15 can be maintained and replaced easily.

In the above-mentioned embodiments of the present disclosure, a squeezing sheet 16 is arranged at the residue discharge opening 122.

In the embodiments of the present disclosure, the squeezing sheet 16 is arranged at the residue discharge opening 122 to further extrude the food, so that the juice-residue separation of the food is more thorough, then more food juice can be extruded, and thus the juice yield of the food processor can be improved.

As shown in FIG. 7 to FIG. 10, the embodiment of the present disclosure provides a food processor, including: a feed opening; a crushing component, and the crushing component includes a second barrel body 11 and a crushing device 13 located in the second barrel body 11, the second barrel body 11 communicates with the feed opening, and the crushing device 13 is used for crushing food; the squeezing component in any embodiment, and the second barrel body 11 and the feed inlet 18 of the squeezing component communicate with each other; and a host component 2, and the crushing component and the squeezing component are installed on the host component 2, the host component 2 includes a driving component 21, and the driving component 21 is used for driving the crushing device 13 to crush the food and is used for driving the squeezing threaded rod 14 to extrude juice and discharge residues, and the crushing component and the squeezing component form a barrel body component, and the barrel body component is installed on the host component 2.

According to the food processor provided by the embodiment of the present disclosure, after the food enters the second barrel body 11 from the feed opening, the food is crushed by the match of the crushing device 13 and the side wall of the second barrel body 11, and the crushed food enters the first barrel body 12 from the feed inlet 18 under the action of the crushing device 13 and is extruded by the squeezing threaded rod 14 to separate the juice of the food from the residues. In the embodiments of the present disclosure, the crushing process and the juice squeezing and residue discharge process of the food are separately performed, no juice squeezing or residue discharge is required in the crushing process, therefore a filter screen and a rotary brush and other components are not necessary to be arranged in the second barrel body 11, so that the food in the second barrel body 11 can be crushed under the combined action of the second barrel body 11 and the crushing device 13, meanwhile, the squeezing threaded rod 14 can be approximately horizontally arranged in the juice squeezing and residue discharge process, that is, a juice squeezing and residue discharge system can be set to be horizontal, accordingly the juice and residues of the food can be conveniently separated, this setting can ensure the juice yield of the food processor on one hand, and can avoid the use of the filter screen, the rotary brush and other parts and components on the other hand, in this case, the food processor is simple in structure and is easy to install, meanwhile as the filter screen is omitted, the cleaning difficulty of the user can be reduced, and then the user experience can be improved.

Figure 7:
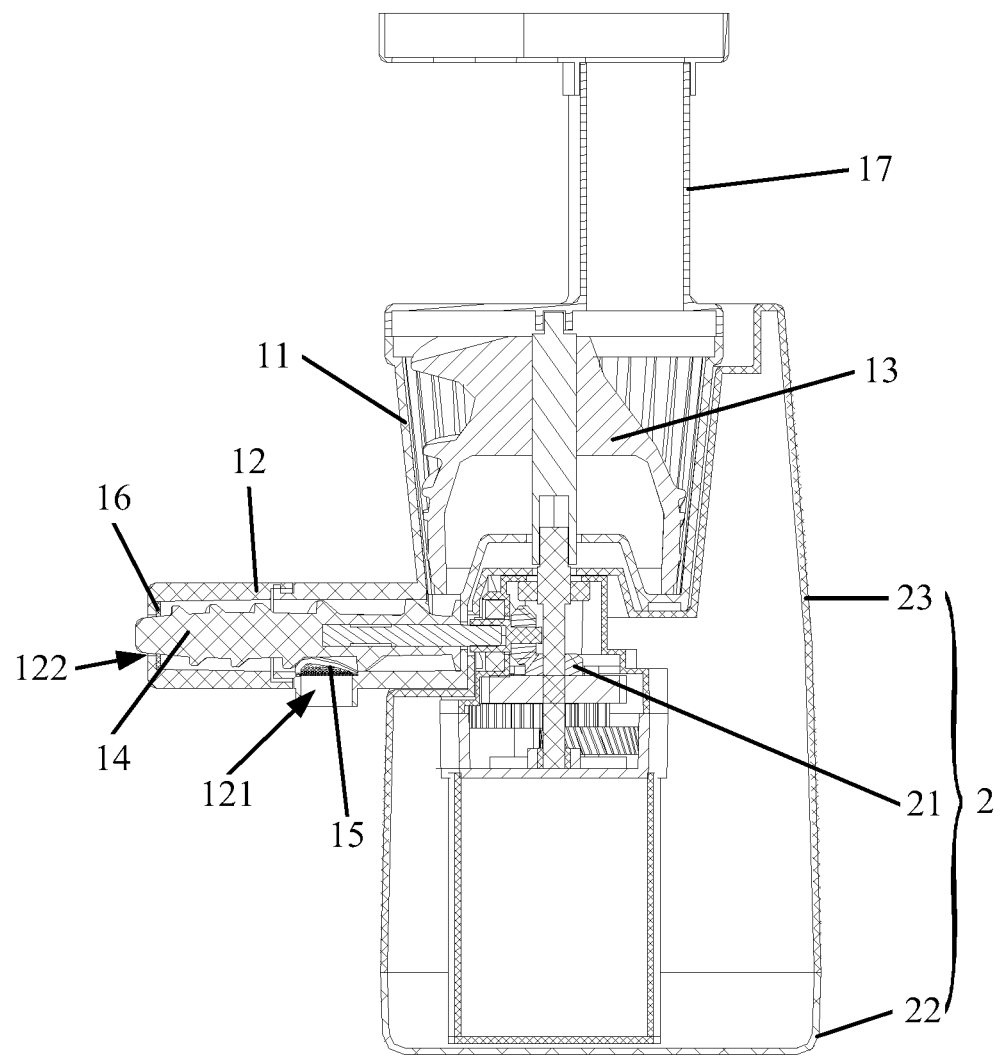
FIG. 7 is a structural schematic diagram of the food processor in one embodiment of the present disclosure.
Figure 8:
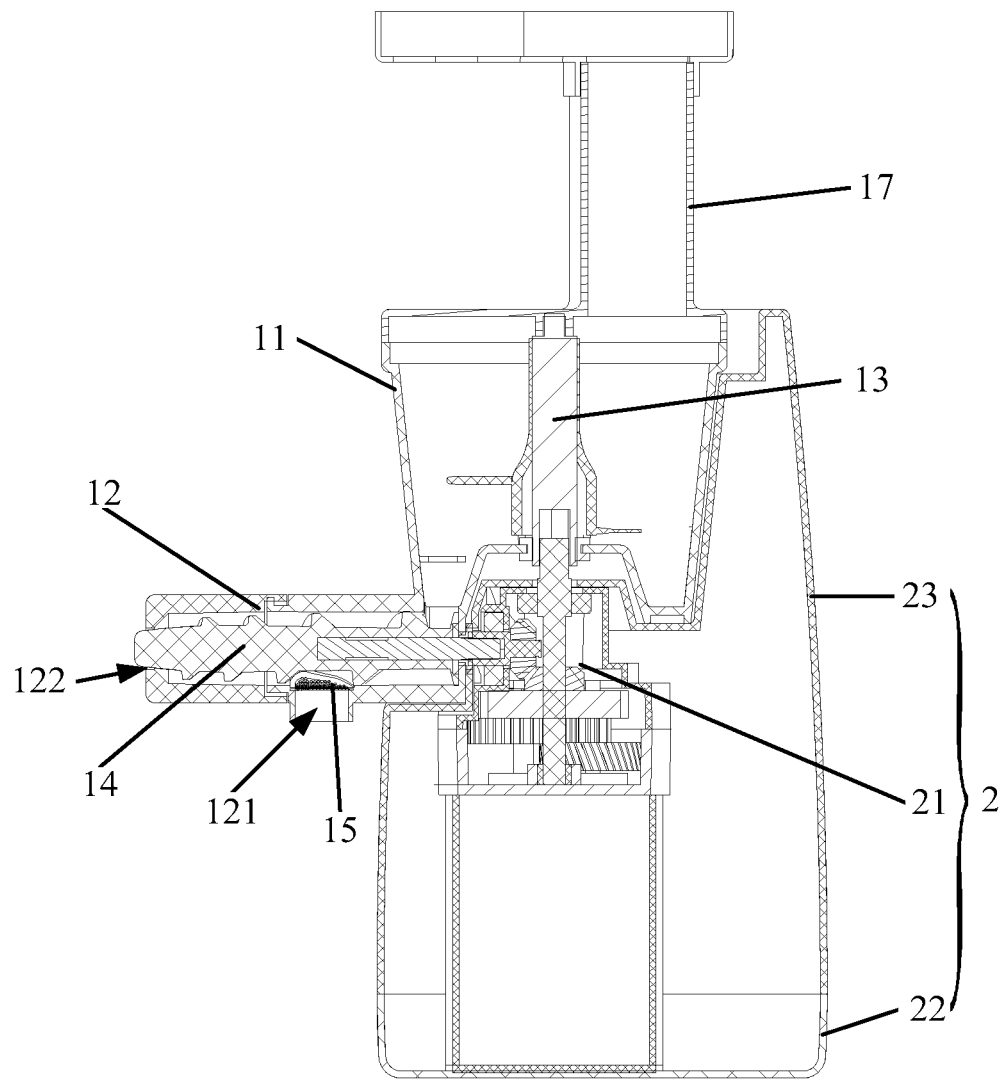
FIG. 8 is another structural schematic diagram of the food processor in one embodiment of the present disclosure.
Figure 9:
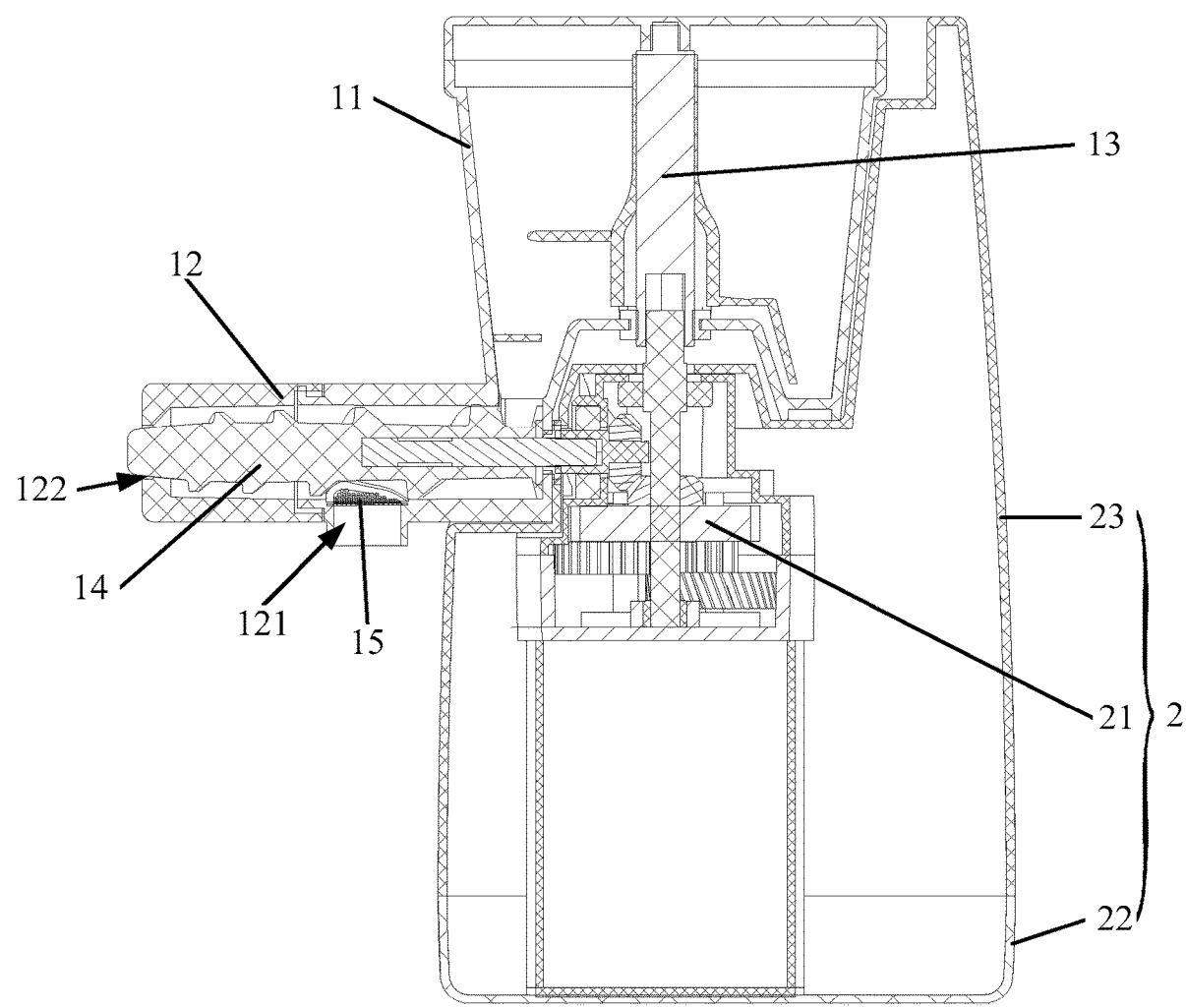
FIG. 9 is yet another structural schematic diagram of the food processor in one embodiment of the present disclosure.

In the above-mentioned embodiments of the present disclosure, as shown in FIG. 7 to FIG. 9, the size of the second barrel body 11 gradually decreases from one end close to the feed opening to one end close to the feed inlet 18.

In the embodiments of the present disclosure, the second barrel body 11 can be set into a shape having a large upper part and a small lower part, specifically, if the second barrel body 11 is circular, the diameter of the second barrel body 11 gradually decreases from top to bottom, and if the second barrel body 11 is not circular, the width and the length of the cross section of the second barrel body 11 gradually decrease from top to bottom. Due to this setting, the food can be cut smaller and smaller, specifically, for example, when the food just enters the second barrel body 11, the granules of the food are greater, the distance between the inner side wall of the second barrel body 11 and the crushing device 13 adapts to the granules of the food, the food is gradually crushed to smaller granules and gradually moves toward the feed inlet 18 under the action of the crushing device 13 and the second barrel body 11, so the gap close to the feed inlet 18 is set to be smaller, in this case, the gap can adapt to the sizes of the granules of the food herein on one hand, the food herein can be further crushed to smaller granules under the action of the crushing device 13 on the other hand, accordingly step-by-step sufficient crushing of the food can be realized, and then the juice yield of the food can be improved.

Figure 10:
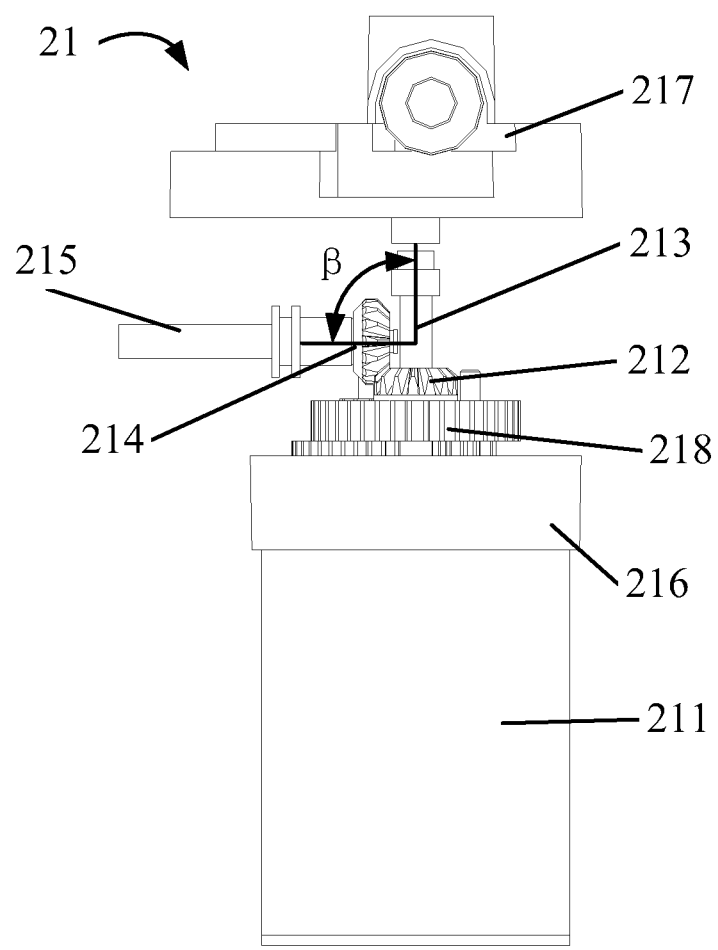
FIG. 10 is a schematic diagram of a partial structure of the food processor in one embodiment of the present disclosure.

In the above-mentioned embodiments of the present disclosure, as shown in FIG. 10, the driving component 21 includes: a motor 211, and a motor shaft is arranged on the motor 211; a transmission component, and the transmission component at least includes: a first transmission part 212, and the first transmission part 212 is in driving connection with the motor shaft, a first driving shaft 213 is arranged on the first transmission part 212, and the first driving shaft 213 is connected with the crushing device 13 and is used for driving the crushing device 13 to crush the food; and a second transmission part 214, and the second transmission part 214 is in driving connection with the motor shaft, a second driving shaft 215 is arranged on the second transmission part 214, and the second driving shaft 215 is connected with the squeezing threaded rod 14 and is used for driving the squeezing threaded rod 14 to extrude juice and discharge residues; and the first driving shaft 213 is vertically arranged, the first driving shaft 213 forms a preset angle β with the second driving shaft 215, and the value of the preset angle β is: 60°≤β≤135°.

In the embodiments of the present disclosure, two or more driving shafts can simultaneously drive the crushing device 13 and the squeezing threaded rod 14 by means of the transmission of the same motor 211 and the transmission component, that is, the driving component 21 drives a plurality of shafts, including two or more shafts, by the same motor 211, the driving shafts can be realized by the same reduction gearbox or different reduction gearboxes, and specifically, the direction can be changed by in a transmission manner of different gears or other transmission manners, such as transmission of a helical bevel gear, a turbine and worm, a staggered shaft helical gear and the like, in order to realize preset angle output among the plurality of driving shafts. In addition, the first driving shaft 213 and the second driving shaft 215 can rotate on the same direction, for example, rotating clockwise or rotating counterclockwise, of course, the first driving shaft 213 and the second driving shaft 215 can also rotate oppositely, and specifically, for example, one rotates clockwise and the other rotates counterclockwise. In one embodiment, the preset angle β is greater than or equal to 60° and is smaller than or equal to 135°, and further the preset angle β is greater than or equal to 70° and is smaller than or equal to 120°, and specifically, as shown in FIG. 7 to FIG. 10, the preset angle β is 90°, that is, the first driving shaft and the second driving shaft are arranged to be vertical to each other.

In the above-mentioned embodiments of the present disclosure, as shown in FIG. 7, the crushing device 13 is a grinding spiral head, or as shown in FIG. 8 and FIG. 9, the crushing device 13 is a cutting knife.

In the embodiments of the present disclosure, the food can be crushed and pushed into the second barrel body 11 by using the grinding spiral head or the cutting knife, and meanwhile, juice squeezing and residue discharge can be realized by using the squeezing threaded rod 14.

In the above-mentioned embodiments of the present disclosure, a rotating speed ratio of the first driving shaft 213 to the second driving shaft 215 is C, and the value of the rotating speed ratio C is: 2/3≤C≤3.

In the embodiments of the present disclosure, the parameters of the first transmission part 212 and the second transmission part 214 are reasonably selected to control the rotating speed ratio of the first driving shaft 213 to the second driving shaft 215, so that the rotating speeds of the first driving shaft 213 and the second driving shaft 215 can adapt to specific application occasions. Specifically, for example, when the crushing device 13 is the grinding spiral head, the rotating speed ratio of the first driving shaft 213 to the second driving shaft 215 is within the range of 0.8-1.5, specifically, for example, when the rotating speed of the grinding spiral head is 60 RPM, the rotating speed of the squeezing threaded rod 14 is set to 48-90 RPM. When the crushing device 13 is the cutting knife, the rotating speed ratio of the first driving shaft 213 to the second driving shaft 215 is within the range of 1-3, specifically, for example, when the rotating speed of the squeezing threaded rod 14 is set to 60 RPM, the rotating speed of the cutting knife is 60-180 RPM.

In the above-mentioned embodiments of the present disclosure, the first transmission part 212 and the second transmission part 214 are bevel gears which are engaged with each other; or the first transmission part 212 is a turbine, and the second transmission part 214 is a worm; or the first transmission part 212 and the second transmission part 214 are two helical gears whose shafts are arranged to be stagger to each other.

In the embodiments of the present disclosure, when the output direction of the motor 211 is changed into multi-shaft and multi-angle output by using the transmission component, the first transmission part 212 and the second transmission part 214 can select a plurality of transmission manners, specifically, for example, the transmission manner of the bevel gear and the bevel gear, of course, can also be the transmission manner of the turbine and the worm, and of course, can also be the transmission manners of stagger shaft helical gears, etc.

In the above-mentioned embodiments of the present disclosure, as shown in FIG. 10, the transmission component further includes: a shell, and the shell includes an upper shell 217 and a lower shell 216, which are assembled together, the upper shell 217 and the lower shell 216 are enclosed to form an installation cavity, the first transmission part 212 and the second transmission part 214 are located in the installation cavity, and the first driving shaft 213 and the second driving shaft 215 extend out from the shell.

In the embodiments of the present disclosure, the first transmission part 212, the second transmission part 214, the first driving shaft 213 and the second driving shaft 215 can be installed in the shell, therefore during specific use, the transmission component can be moved and replaced as an entirety.

In the above-mentioned embodiments of the present disclosure, as shown in FIG. 10, the transmission component further includes a deceleration component 218 arranged between the first transmission part 212 and the motor shaft and used for reducing the rotating speed of the motor shaft to a rotating speed necessary for the first driving shaft 213 and the second driving shaft 215.

In the above-mentioned embodiments of the present disclosure, as shown in FIG. 7 and FIG. 8, the food processor further includes: a feeding barrel 17, and the feeding barrel 17 is arranged on the second barrel body 11, and the feed opening is arranged on the feeding barrel 17.

In the embodiments of the present disclosure, a feeding barrel 17 can be arranged for controlling the feeding of the food, and at this time, the feed opening is arranged on the feeding barrel 17.

In another embodiments of the present disclosure, as shown in FIG. 9, no feeding barrel 17 is arranged, and the food is directly placed in the second barrel body 11 at one time, at this time, a lid capable of being opened or closed is arranged on the second barrel body 11, and the feed opening is the opening of the second barrel body 11.

In the above-mentioned embodiments of the present disclosure, as shown in FIG. 7 to FIG. 9, the host component 2 further includes a base 22 and an enclosure 23, and the enclosure 23 and the base 22 are enclosed to form an accommodation cavity, and the driving component 21 is installed on the base 22 and is located in the accommodation cavity.

In the above-mentioned embodiments of the present disclosure, the host component 2 further includes a control module used for controlling working parameters of the food processor, specifically, for example, the rotating speeds of the crushing device 13 and the squeezing threaded rod 14, and the like, of course, a program module can also be provided to realize intelligent program control of the food processor, and specifically, for example, a cleaning program module, a plurality of juicing program modules and the like can be provided to realize the intelligent juicing and intelligent cleaning of the food processor.

In the above-mentioned embodiments of the present disclosure, the host component 2 further includes a power supply module, and the power supply module is used for supplying power for the parts and components of the food processor, for example, the driving component 21, and the power supply module at least includes a power plug that can be plugged into the mains supply, and thus, during specific use, the power plug can be directly connected with the mains supply so as to supply power for the food processor.

In the above-mentioned embodiments of the present disclosure, the food processor includes a juicer and a juice extractor.

In the description of the present specification, the terms "first" and "second" are used for descriptive purposes only and cannot be construed as indicating or implying relative importance, unless expressly stated and limited otherwise; the terms "connection", "installation", "fixation" and the like should be broadly defined unless otherwise specified or indicated, for example, the "connection" may be a fixed connection, may also be a detachable connection, or an integral connection or an electrical connection; and it may be directly connected and may also be indirectly connected through an intermediate medium.

In the description of the present specification, the description of the terms "one embodiment," "some embodiments," "specific embodiments" and the like means that a particular feature, structure, material or characteristic described in combination with the embodiment or example is included in at least one embodiment or example of the present disclosure. In the present specification, the schematic representation of the above terms does not necessarily refer to the same embodiment or example. Furthermore, the particular features, structures, materials or characteristics described may be combined in any suitable manner in any one or more embodiments or examples.

What is claimed is:

1. A squeezing component for a food processor, comprising:
a first barrel body, wherein a feed inlet is arranged at one end of the first barrel body, a residue discharge opening is arranged at the other end of the first barrel body, and a juice discharge opening is arranged on a side wall of the first barrel body; and
a squeezing threaded rod comprising a rod body which comprises a feeding segment, a squeezing segment connected with the feeding segment and a residue discharge segment connected with the squeezing segment; wherein the area of the cross section of the rod body gradually increases from the feeding segment to the squeezing segment, and wherein the squeezing threaded rod is rotatably installed in the first barrel body, the feeding segment of the squeezing threaded rod is matched with the feed inlet, the residue discharge segment of the squeezing threaded rod is matched with the residue discharge opening, the juice discharge opening being arranged on the side wall of the first barrel body corresponding to the squeezing segment of the squeezing threaded rod;
wherein a rod segment between a first thread and a second thread on the feeding segment of the squeezing threaded rod is provided with material pressing planes.

2. The squeezing component of claim 1, wherein a residue discharge inclined plane extending toward the residue discharge opening is arranged on the inner side wall of the first barrel body corresponding to the residue discharge opening, and the residue discharge inclined plane is used for guiding the food residues to the residue discharge opening.

3. The squeezing component of claim 1, wherein the feeding segment of the squeezing threaded rod is located below the feed inlet;
wherein the projection width L1 of the feed inlet in the radial direction of the squeezing threaded rod is greater than the diameter of the feeding segment, and the projection length of the feed inlet in the axial direction of the squeezing threaded rod is L2, the value of which is more than or equal to 3.8 mm and less than or equal to 19.9 mm.

4. The squeezing component of claim 1, wherein,
a filter sheet is arranged at the juice discharge opening, wherein the filter sheet is in contact with the threads of the squeezing threaded rod, or a gap a is arranged between the filter sheet and the threads of the squeezing threaded rod, and the gap a is smaller than the sizes of the granules of the food residues.

5. The squeezing component of claim 4, wherein the value of the gap is more than or equal to 0.2 mm and less than or equal to 5 mm.

6. The squeezing component of claim 4, wherein the filter sheet and the first barrel body are of an integral structure or the filter sheet is detachably installed at the juice discharge opening.

7. The squeezing component of claim 1, wherein,
a squeezing sheet is arranged at the residue discharge opening.

8. A food processor, comprising:
a feed opening;
a crushing component which comprises a second barrel body and a crusher located in the second barrel body, wherein the second barrel body communicates with the feed opening, and the crusher is used for crushing food;
a squeezing component comprising a first barrel body, wherein a feed inlet is arranged at one end of the first barrel body, a residue discharge opening is arranged at the other end of the first barrel body, and a juice discharge opening is arranged on a side wall of the first barrel body; and a squeezing threaded rod comprising a rod body which comprises a feeding segment, a squeezing segment connected with the feeding segment and a residue discharge segment connected with the squeezing segment; wherein the area of the cross section of the rod body gradually increases from the feeding segment to the squeezing segment, the squeezing threaded rod is rotatably installed in the first barrel body, the feeding segment of the squeezing threaded rod is matched with the feed inlet, the residue discharge segment of the squeezing threaded rod is matched with the residue discharge opening, the juice discharge opening being arranged on the side wall of the first barrel body corresponding to the squeezing segment of the squeezing threaded rod, and wherein the second barrel body and the feed inlet of the squeezing component communicate with each other; and a host component on which the crushing component and the squeezing component are installed, wherein the host component comprises a driving component which is used for driving the crusher to crush the food and is used for driving the squeezing threaded rod of the squeezing component to extrude juice and discharge residues;

wherein a rod segment between a first thread and a second thread on the feeding segment of the squeezing threaded rod is provided with material pressing planes.

9. The food processor of claim 8, wherein the driving component comprises:
   a motor on which a motor shaft is arranged;
   a transmission component at least comprising:
   a first transmission part in driving connection with the motor shaft, wherein a first driving shaft is arranged on the first transmission part, and the first driving shaft is connected with the crusher and is used for driving the crusher to crush the food; and
   a second transmission part in driving connection with the motor shaft, wherein a second driving shaft is arranged on the second transmission part, and the second driving shaft is connected with the squeezing threaded rod and is used for driving the squeezing threaded rod to extrude juice and discharge residues;
   wherein the first driving shaft is vertically arranged, the first driving shaft forms a preset angle $\beta$ with the second driving shaft, the value of which is more than or equal to 60° and less than or equal to 135°.

10. The food processor of claim 8, further comprising:
   a feeding barrel arranged on the second barrel body, wherein the feed opening is arranged on the feeding barrel.

11. The food processor of claim 8, wherein after the food enters the second barrel body from the feed opening, the food is crushed by cooperation of the crusher and sidewall of the second barrel body.

* * * * *